Sept. 16, 1952 F. W. PEEL 2,610,559
COTTON CHOPPER

Filed Aug. 8, 1947 4 Sheets-Sheet 1

Fig. 1.

INVENTOR.
FREDERICK W. PEEL
BY Ostrolenk and Faber
ATTORNEYS

Sept. 16, 1952   F. W. PEEL   2,610,559
COTTON CHOPPER
Filed Aug. 8, 1947   4 Sheets-Sheet 3

INVENTOR.
FREDERICK W. PEEL
BY Ostrolenk and Faber
ATTORNEYS

Sept. 16, 1952      F. W. PEEL      2,610,559
COTTON CHOPPER Filed Aug. 8, 1947      4 Sheets-Sheet 4

INVENTOR.
FREDERICK W. PEEL
BY
Ostrolenk and Faber
ATTORNEYS

Patented Sept. 16, 1952

2,610,559

UNITED STATES PATENT OFFICE 2,610,559

COTTON CHOPPER

Frederick W. Peel, Somerville, Tenn.

Application August 8, 1947, Serial No. 767,404

9 Claims. (Cl. 97—13)

My present invention relates to cultivators and more particularly to a cotton chopper adapted to thin young cotton growth by cutting out young plants between the plants which it is desired to retain and at the same time cut down weeds adjacent the plant row.

Heretofore in the construction and operation of cotton choppers and other cultivators, attempts have been made to imitate the action of the hand-wielded hoe either by the use of blades moving longitudinally of the row or transverse to the row. Such imitative action however has universally proven inefficient since control of a hoe-type blade to move it in one direction only scarcely meets the requirements of proper hoeing operations.

Attempts have also been made to use a pair of rotating, shear type blades with matching gaps in the blades at spaced points to chop out the cotton row leaving spaced plants standing. But such blades are necessarily rotated at very slow speed since any increased speed would chop out all plants in the row. Thus, unless the blades were continuously sharpened, their slow speed tended to bend over the plants rather than cut them, even, at times, where the blades met. The slow speed of the blades prevented their cutting the weeds down adjacent the row, the weeds merely bending over as the blades passed over. Such blades required additional means to clear them of soil, mud and weeds.

Also, most prior mechanical cotton choppers have been arranged so that the chopping mechanism was pushed along the row rather than pulled. Therefore, any unevenness in the row or irregularity in the ground adjacent the row tended to pull the chopping mechanism out of line first before the propelling mechanism thereby tending to cut out desired plants or skipping the chopping operation altogether before the course of the mechanism could be detected and changed. Even where tractive mechanism has been used, chopping mechanisms of various unsatisfactory types have been combined with other means such as loosely mounted weeding discs wherein any unevenness in the ground threw the cultivator off so that it did not chop properly in the row.

Other types of chopping means have utilized scrapers which either made undesirable pot holes in the row or merely bent over the weeds and the plants rather than chopping them out.

Still other choppers, although mechanical, have not been automatic, requiring accurate timing by the operator, including the setting and releasing of brakes and clutches at every chopping operation.

With all the attempts which have been previously made to produce mechanical cotton choppers, it is still more efficient and less expensive to use fifty men to chop out and weed twenty-five acres of cotton in one day than to use any mechanical, heretofore known means to chop and weed the same acreage. On a medium size farm with approximately five hundred acres of cotton under cultivation, where it becomes necessary to chop out and weed all the cotton rows practically simultaneously, the man-power requirements, in the absence of efficient mechanical means, have made it necessary to maintain a large labor force, which, owing to the seasonal nature of the work, enjoys only occasional periods of good pay. This tends to depress the economy of cotton growing areas so that these areas tend to consume less than their fair share of the national output thereby tending to retard the national economy as a whole.

My invention is directed to an automatic mechanical cotton chopper adapted to be pulled along the row by mechanical or other tractive means and so arranged that a set of high speed horizontally rotating radial blades extending from a central cone, dome or other protective element positively chops out and weeds the row. The constantly rotating blades are alternately raised above and lowered toward the row. When lowered toward the row, the central dome, cone or other protective means covers the plant which is to be retained while the rotating blades cut out of the other plants and the weeds as well.

A cam action operated by an eccentric, a crank, a loose linkage or other mechanism causes the blades and the portion of the carrier which positions them to move backwards with respect to the remainder of the mechanism while the blades are lowered to cutting position; by this means the blades rotate on a substantially stationary axis with respect to the ground during cutting since, of course, the entire mechanism is being pulled forward at about the speed of a medium walking pace during the entire operation.

After the blades are raised, the end of the carrier is swung forward with respect to the mechanism; the carrier is then lowered and swung back again to chop out the undesired plants and weeds, and the cycle is repeated.

Where plants are to be thinned out to leave the remaining plants at one foot intervals, then the blade carrier should be lowered once per linear foot and, of course, raised between cutting operations. With the drive taken from the main tractive wheel of the mechanism by a pulley on its axle, then with a wheel five feet in circumference, the drive for raising and lowering the mechanism should be at a five to one ratio. But the drive for rotating the blades should be at a speed of the order of one hundred to one or more to produce a sufficiently high speed rotation of the blades to throw off soil, mud and weeds collected thereon and to ensure proper cutting of plants and weeds. The blades should extend out from the center of the cone, dome or other protective means by about six inches or more on each side in the example given. A longer blade, of the order of ten inches will produce double cutting over the same area because successive cuts will overlap without reaching back to the last retained plant, but will require that a speed not less than a predetermined minimum be maintained to avoid cutting plants which are to be retained.

Preferably, the blades and protective dome or cone are replaceable to accommodate various size plants. The stroke of the carrier toward and away from the plants should also be adjustable for plants at different stages of growth. The actual length of stroke may be the same but the lower limit of the stroke, and as a result the upper limit, may be varied for plants of different height.

Preferably and for simplified operation a single crank shaft connected by a simple pivoted lever to the blade carrier may be used to raise and lower the blade carrier; the same crank shaft being also used to swing the operative end of the blade carrier back with respect to the mechanism, holding it substantially stationary with respect to the ground during cutting. The two operations are therefore accurately and inescapably synchronized since they are operated from the same shaft. A change in the pulley ratio between the driving wheel and the crank shaft will permit variations in the length of the spaces cut out; the blades and cone or dome being also changed to a size commensurate with the spaces and height of plant. Thus the driven pulley for the crank shaft may be made readily replaceable.

Preferably the dome or cone or other protective means will carry the blades extending from their periphery.

Since the blades may at times cut rather deeply into the hill, especially at the leading side of the carrier, it is desirable to provide means for scraping the soil back into the hill. Accordingly, my novel device carries a plurality of scrapers behind the chopping blades directed to throw soil back to the hill. It is necessary, however, to protect the young plants which have been left standing. For this purpose I provide an inverted trough or channel member to carry the scrapers, the said channel member being just sufficient in width for its walls to pass on either side of the standing plants and protect them from the soil being scraped back.

The primary object of my invention therefore is the provision of novel mechanical cotton chopping and weeding apparatus adapted to be drawn along the row to thin out the plants and remove the weeds.

Another object of my invention is the utilization of high speed horizontally rotating blades for chopping and weeding purposes.

Another and important object of my invention is the provision of novel cotton chopping and weeding apparatus comprising a plurality of high speed horizontally rotating blades alternately raised to clear the plant or plants to be retained and lowered to chop and weed.

A further object of my invention is the provision in cotton chopping mechanism of novel means for protecting the plant to be retained in connection with high speed horizontal rotating chopping blades.

Another object of my invention is the provision of a protective cone or dome for supporting the horizontal high speed chopping blades.

Another object of my invention is the utilization of the protective cone or dome to removably secure the blades to the high speed shaft which carries them.

Another object of my invention is the provision of novel readily adjustable chopping elements in cotton chopping mechanism.

Another object of my invention is the provision of novel means for readily changing the blades of my cotton chopping mechanism.

Another object of my invention is the provision of novel simplified means for adjusting the vertical stroke of my cotton chopper.

Another object of my invention is the provision of novel vertically movable chopping mechanism combined with high speed rotating blades and a central protective member for the plant to be retained.

Another object of my invention is the provision, in connection with a vertically movable chopper of means for holding the operative end of the chopper stationary with respect to the ground when the chopper moves down to the row.

Another object of my invention is, in connection with the foregoing, the provision of means for causing the operative end of the cotton chopper to oscillate horizontally with respect to the remainder of the mechanism as the chopper moves up and down.

Another object of my invention is the provision of novel and simplified means dependent primarily on the speed of rotation of a plurality of horizontal blades to clear the blades of soil, mud and weeds.

Still another object of my invention is the provision of novel means for adjusting the chopper elements to plants of different heights or stages of growth and to various plant spacing requirements.

Another object of my invention is the provision of novel means for restoring soil to the row after the chopping operation while at the same time protecting the selected plants from the soil which is thrown back.

A further object of my invention is the provision of novel combined tractive means in connection with high speed cotton chopping and weeding elements.

Still another object of my invention is the provision of novel fully automatic chopping and weeding apparatus requiring only to be drawn by mechanical or other tractive means and to be guided while it is being drawn.

The foregoing and many other objects of my invention will become apparent in the following description and drawings in which:

Figure 9 is a fragmentary view of a modified oscillating lever for the chopper element to adjust the vertical position of the stroke thereof when protective cones or domes of different heights are used.

Referring now to the figures, my novel device is here shown as a self-contained unit which may carry its own power plant at the front to drive the main tractive wheels and which may be provided with appropriate rearwardly directed handles clearing the back of the device and carrying the necessary power controls in a manner which is now well known in hand guided power driven farm implements.

My novel device may also be arranged to be hitched as an attachment to hand guided mechanical tractive power units of well known type; or it may be provided with rearwardly extending guiding handles of its own and hitched to a mule, a small tractor or other tractive device.

Figure 1:
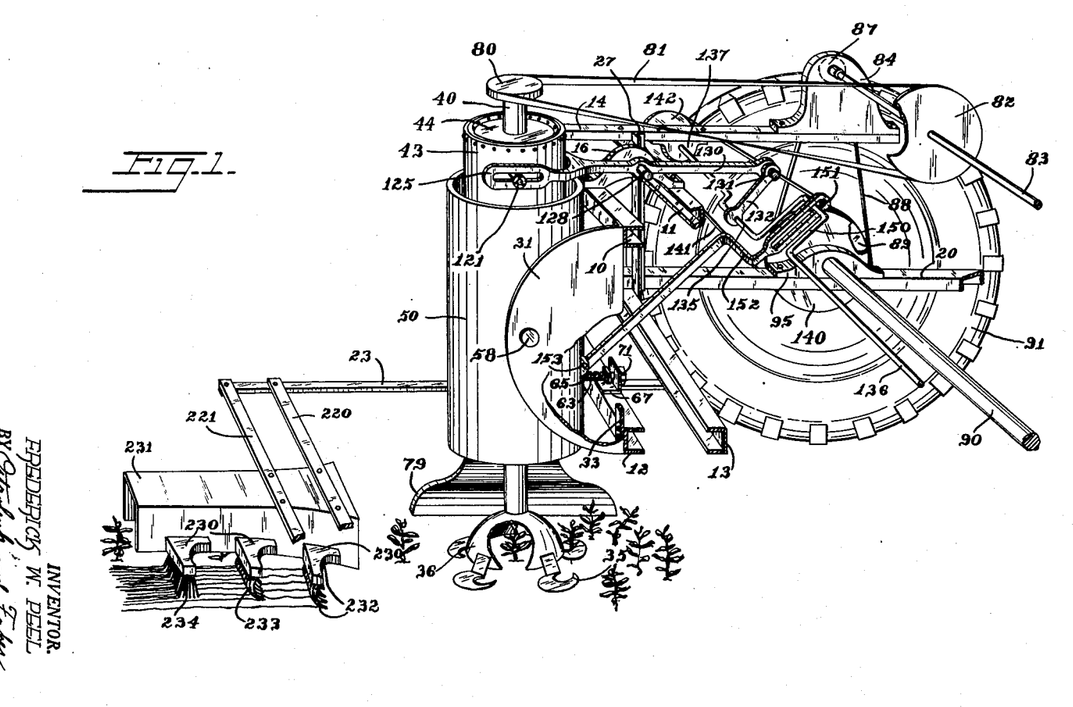
Figure 1 is a view in perspective partially broken away showing the primary elements of my invention.
Figure 2:
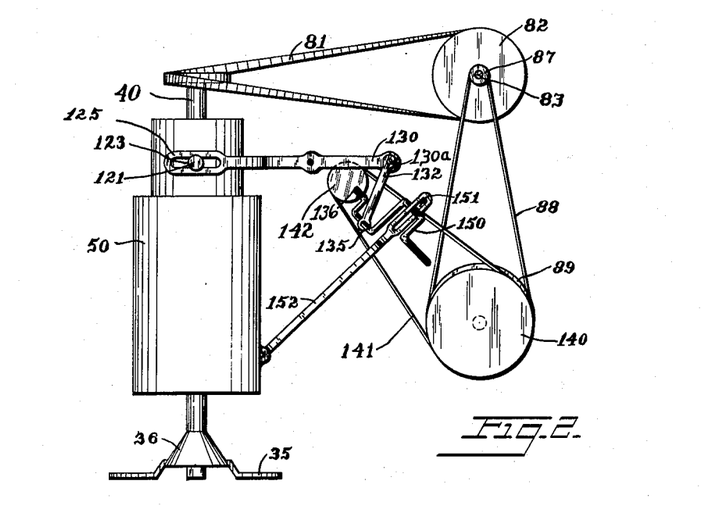
Figure 2 is a schematic view illustrating the operation of my novel device.
Figures 4, 7:
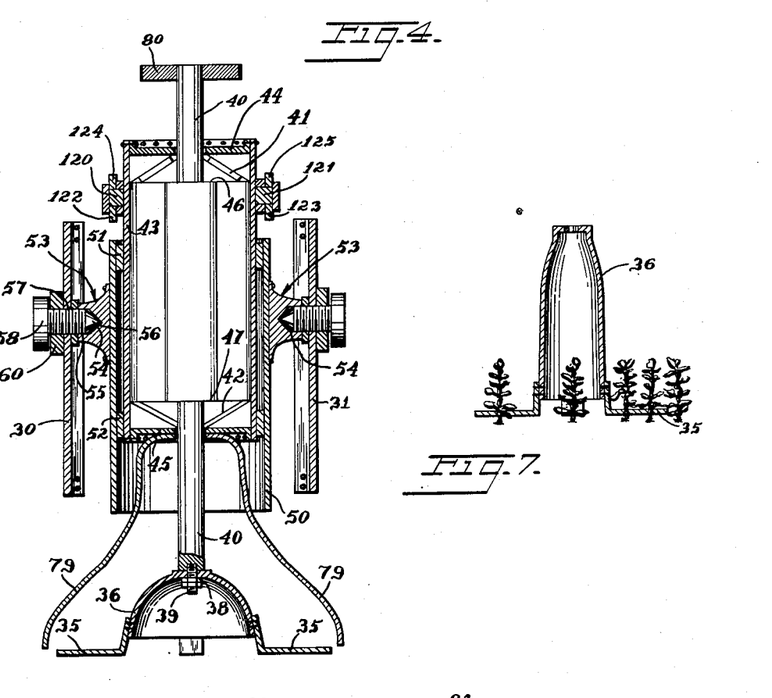
Figure 4 is a vertical view partly in cross-section of the blade carrier of my novel device taken on line 4—4 of Figure 3.
Figure 7 is a cross-sectional view of a protective cone or dome and blades adapted to be used for small plants, the added upper length of the cone or dome being provided to avoid the necessity for changing the stroke of the chopper for small plants.
Figure 5:
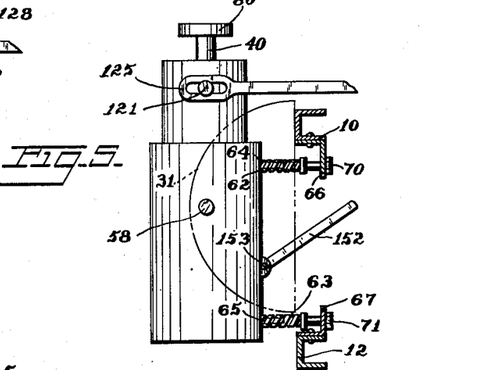
Figure 5 is a side view, partly in section of the blade carrier.
Figure 6:
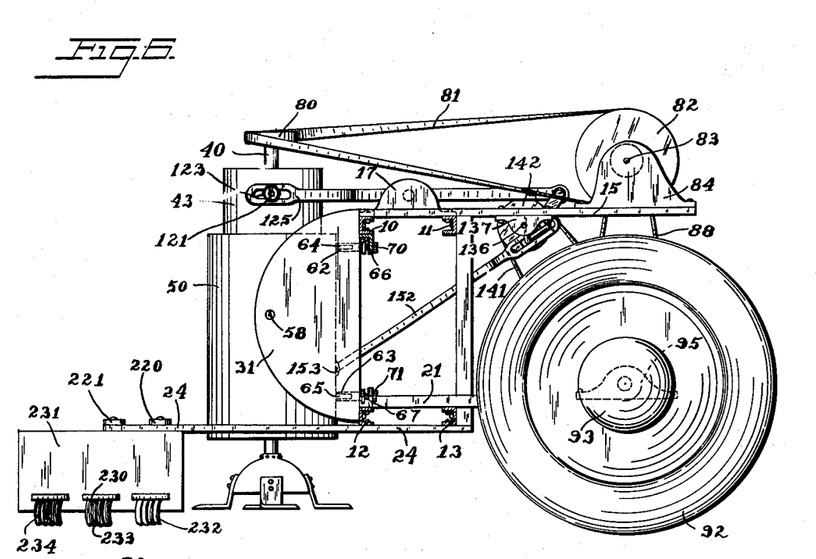
Figure 6 is a side view of my novel device.

In Figure 1, I have shown my novel cotton chopper and weeder in perspective partially broken away to illustrate the major operating elements for the chopper and weeder blades illustrated more clearly in Figures 4 and 5.

The main frame of the mechanism comprises a pair of upper transverse horizontal channels 12, 13.

The upper channel members 10, 11 are interconnected by the upper longitudinal bars 14, 15 secured in any suitable manner as by bolts to the outer ends of channels 10, 11. Bars 14 and 15 are extended forward of channel 11 to furnish a support for the crank shaft and blade-spinning pulleys hereinafter described.

The upper channel members are also interconnected by the longitudinal brackets 16, 17 which furnish a support for the pivot of the blade raising and lowering lever hereinafter described.

The lower transverse channels 12 and 13 are longer than the upper channels 10, 11 in order to provide clearance for the driving pulleys carried by the axle of at least one of the driving wheels in the manner hereinafter described.

Lower channels 12 and 13 are interconnected by the longitudinal horizontal bars 20, 21 which may be heavy structural bars, I beams, channels, angle bars or of any other suitable structural cross-section. Bars 20 and 21 are also extended forward to provide a support for the axle of the main wheels of the device and also, where necessary, to provide a support, preferably forward of the main wheels, for the power plant connected to drive the main wheels of the cotton chopper and weeder.

The lower transverse channels 12 and 13 are also interconnected by the longitudinal bars 23, 24 which are extended rearwardly to provide a support for the soil scrapers also hereinafter described.

The upper set of transverse channels 10 and 11 and the lower set of transverse channels 12 and 13 and their associated frame elements are interconnected by the vertical channel members 27, 28 interconnecting the front transverse channel members 11 and 13 and by the vertical bracket members 30, 31, the flanges 32 and 33, respectively, of which interconnect the rear channel members 10 and 12.

Where necessary for additional bracing of the structure, the portions of the bars 14 and 20 forward of the front channel members 11 and 13 may be interconnected by appropriate substantially vertical braces at points which will not interfere with the operation of the various elements of the mechanism; and similar portions of bars 15 and 21 may similarly be connected together by reinforcing braces.

The cotton chopper and weeder itself comprises the blades 35 connected to the protective dome or cone 36. The blades 35 are substantially horizontal and are rotated rapidly in a horizontal plane about the central vertical axis of the protective cone or dome 36 (see also Figure 4). The protective cone or dome 36, carrying the blades 35, is removably connected in any suitable manner as by the nut 38 to the threaded extension 39 of the high speed shaft.

The blades 35 may be made integral with the protective cone or dome 36 or may be connected thereto in any suitable manner. They may also be made individually removable and replaceable to facilitate sharpening, replacement and repair.

Shaft 40 is rotatably supported in thrust bearings 41, 42 which are secured in any suitable manner in the vertically slidable tube 43. The ends of the tubes 43 and the bearings may be sealed and protected by the seals 44, 45. The bearings 41, 42 may additionally be spaced from each other by the annular shoulders 46, 47 of the shaft 40 which also provide a suitable bearing surface against the thrust bearings 41, 42.

Tube 43 is vertically slidable, without rotating, in the outer pivotally mounted vertical tube 50. Appropriate friction-reducing rings 51, 52 may be provided to facilitate the sliding motion of tube 43 in tube 50.

Tube 50 is connected by needle-type bearings 52, 53 on each side to the rearwardly extending brackets 30, 31 so that it may pivot back and forth in a vertical plane extending longitudinally of the mechanism. The bearings 52, 53 each comprise a substantially conical bearing seat 54 secured on opposite sides of tube 50. A threaded bolt 55 having a conical end 56 is mounted in a threaded opening 57 in each bracket and is provided with a head 58 by which it may be rotated to appropriate bearing adjustment. The bearing adjustment, when made, may be locked in position by the lock-nut 60. The utilization of this type of adjustable bearing element facilitates the removal of the entire chopper element for replacement or repair where that is desired and also provides a readily adjustable bearing member which may easily be regulated in the field to ensure proper pivoting of the tube 50.

The tube 50 is, however, centered in the vertical position by the compression springs 62, 63 (Figure 5) connected to appropriate lugs or other connectors 64, 65 at the forward vertical end of tube 50 and connected at their opposite ends to brackets 66, 67 carried by transverse horizontal channels 10, 12. Adjusting bolts 70, 71 threaded in brackets 66, 67 and having elements bearing against the ends of and guiding springs 62, 63 may be used to adjust the compression of the springs to ensure initial vertical positioning of tube 50.

The tube 50 and associated chopping elements including shaft 40, dome or cone 36 and blades 35 are thus arranged and resiliently held in vertical position, being biased to return to the vertical position when pivoted therefrom around bearings 52, 53.

The entire chopper assembly may, of course, be pivoted around bearings 52, 53 when required for chopping and weeding purposes as hereinafter described.

A pulley 80 is connected to the upper end of shaft 40. Pulley 80 and hence shaft 40 and blades 35 are rotated at high speed by belt 81 driven by pulley 82 on shaft 83 rotatably carried in bearing brackets 84, 85 on the forward ends of bars 14 and 15. Shaft 83 carries pulley 87 driven by belt 88 from pulley 89 on axle 90 of the wheels 91 and 92.

Wheels 91 and 92 on each side are mounted on axle 90 carried in bearing brackets 95, 96 on the forward ends of bars 20 and 21.

Where the entire mechanism is a self contained motor driven unit, rather than a unit which is hitched to mechanical or other tractive mechanism, then the power plant (not shown) may be mounted across the extended forward ends of bars 20 and 21 and the ultimate drive shaft of the power plant may be connected by chains 100, 101 to sprockets 102, 103 on axle 90. A single chain and sprocket drive for the single axle may be used.

The drive from pulley 89 on axle 90 to pulley 87 and then from pulley 82 to pulley 80 on shaft 40 for rotating blades 35 is at a ratio sufficient to produce a high rate of spin of blades 35. This rate of spin should be such that the blades will not only cut plants and weeds efficiently but also such that the centrifugal force generated by the speed of rotation will throw mud, soil and weeds off the blades automatically. The optimum rate of spin will vary with the use of the apparatus under different conditions but will range from about 500 R. P. M. to 2000 R. P. M.

Side guards 79 may be mounted at the lower end of tube 43 to prevent soil which is thrown off blades 35 from injuring adjacent rows of plants.

Figure 11:
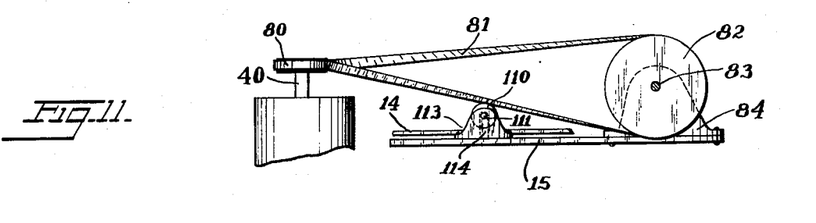
Figure 11 is a fragmentary side view showing the use of a tensioning pulley for the drive of the cotton chopper blades.

The belt connection from pulley 82 to pulley 80 should be such as to permit a vertical stroke of shaft 40 of about eight inches, or 4 inches above and below the norm. This may be accomplished by making the grooves of pulleys 82 and 80 sufficiently deep or the belt 81 sufficiently elastic for this purpose. Preferably, however, a spring biased tensioning pulley 110 (Figure 11) engaging belt 81 may be used for this purpose. The tensioning pulley may be mounted on a shaft 111 carried in an appropriate bracket on a bar 113 between bars 14 and 15, rearward of pulley 82, the tensioning pulley being located below belt 81 and its shaft 111 being spring biased by compression springs 114 upwardly.

It is necessary, also, to move the blades down toward the cotton row to chop and weed and to raise them again to clear the plant or plants which it is desired to retain. Where the blades are to be lowered at one foot intervals and raised again between the intervals, the drive for lowering and raising the blades may be keyed by the proper driving ratio to the main wheel 91 or 92 or their axle or axles. Thus, where the diameter of the main wheels is 18 inches and their circumference 56½ inches, the ratio of the drive to the raising and lowering mechanism should be 56½ to 12.

The raising and lowering mechanism for blades 35 operates on the vertically slidable tube 43 which carries shaft 40 and blades 35.

Figure 3:
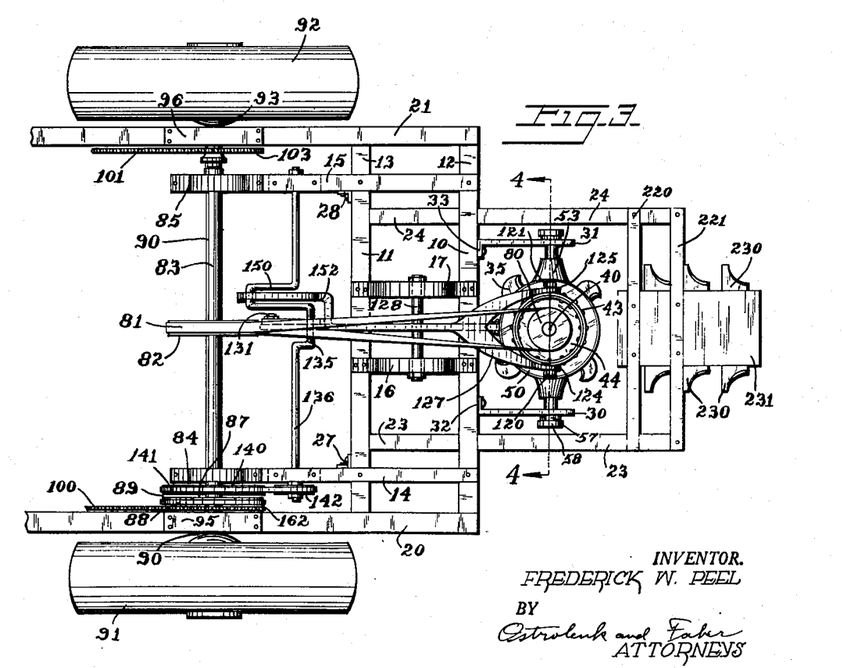
Figure 3 is a top plan view of my novel apparatus.

The tube 43 carries, extending from opposite sides thereof, pins 120, 121 (Figures 1, 3 and 4) which are received in the horizontal slots 122, 123 of the bifurcated clevis ends 124, 125 of lever 130. Lever 130, which extends longitudinally of the machine, is pivoted on shaft 128 carried between brackets 16 and 17 for movement in a vertical plane. The front end of lever 130 is connected by pin 130a to clevis 131 of link 132. The opposite end of link 132 is connected to the eccentric section 135 of crank shaft 136 carried in bearing brackets 137, 137 secured to the underside of bars 14 and 15.

As crank shaft 136 rotates, eccentric section 135 thereof will rise and fall, raising and lowering link 136 and raising and lowering the forward end of lever 127. This will cause the clevis ends 124, 125 of lever 127 alternately to lower and rise thereby lowering and raising tube 43 and shaft 40 together with blades 35.

The drive for shaft 136 is taken from pulley 140 on axle 90. Pulley 140 drives belt 141 which in turn drives pulley 142 eccentrically mounted on crank shaft 136. This drive is at such a ratio related to the circumference of wheel 91 as will produce a lowering of blades 35 once every 12 inches where that is desired or once at any other interval as required. Pulley 142 may be made replaceable to vary the interval between blade lowering operations where that may be required.

Preferably, pulley 142 is eccentrically mounted on crank shaft 136 with the smaller diameter corresponding to the lowered position of the blades. This will bring the blades down and up more quickly and hold them longer at the up position. This will minimize the effect of any forward motion of the blades which may accidentally occur during the lowered position of the blades.

It is necessary to halt the forward movement of the blades during the brief interval when they are lowered so that they will cut in one position only and not move longitudinally along the row during the cutting operation.

For this purpose, crank shaft 136 is provided with another eccentric portion 150 passing through long slot 151 in link 152. The opposite end of link 152 is connected to the clevis 153 adjacent the lower end of outer tube 50. The eccentric portion 150 of crank shaft 136 pushes down against the lower end of slot 151 to push down link 152 at the time blades 35 begin to approach the row. Link 152 pushing against clevis 153 rotates tube 150 and hence the whole chopper assembly including blades 35 clockwise about pivots 52 and 53 thereby moving the blades 35 backwards with respect to the remainder of the mechanism during the cutting operation which occurs rapidly owing to the eccentricity of pulley 142.

The degree of backward movement thus obtained is based on an estimate of the average speed of movement of the chopper and weeder along the row. For practical purposes this is based on an average speed of three miles per hour. The backward movement of the blades 35 by link 152 and portion 150 of crank shaft 136 should these be at this speed during the brief cutting interval to prevent the movement of the blades along the row during actual cutting. The long slot 151 permits the springs 62 and 63 to center the chopper elements once more when they are raised, preparatory to the next cutting operation; the springs thus return the mechanism to the original position for the next operation.

Figure 8:
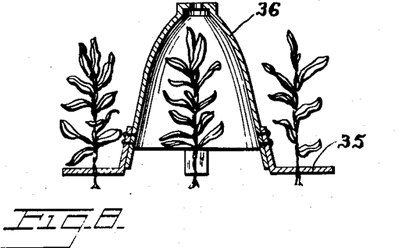
Figure 8 is a cross-sectional view of a protective cone or dome and blades adapted to be used for larger plants.

As above pointed out, the stroke of my novel chopper is preferably eight inches to accommodate for even the largest plants to be chopped out. Different sizes of domes or cones 36 and blades 35 may be used to accommodate for plants at different stages of growth. Thus Figure 7 shows a dome or cone and blade combination adapted for the first chopping operation. Figure 8 shows a dome or cone and blade combination adapted for a later chopping operation. Since domes or cones 36 of Figures 7 and 8 are of the same height but of different cross-section, the same stroke may be used at the same position of the stroke for the different chopping operations.

Figure 10:
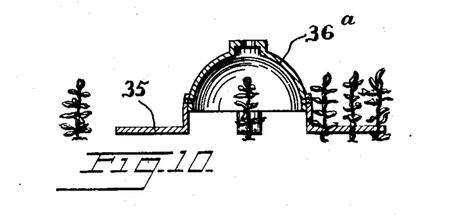
Figure 10 is a cross-sectional view of protective cone or dome of smaller height (with blades) used when the vertical position of the stroke of the chopper can be adjusted as in the apparatus of Figure 9.

It may be desirable, however, to use a shorter dome 36a (Figure 10) for smaller plants and a taller dome as in Figure 8 for larger plants. Then, although the stroke of the chopper blades up and down may remain eight inches, it is necessary to shift the stroke by the difference in height of the domes of Figures 10 and 8 so that the blades of each dome will reach the base of the row.

For this purpose, I provide the adjustment shown in Figure 9 wherein link 127a is a composite link comprising clevis section 125a and main section 127b. The operation of link 127a is identical with that previously described for link 127 of Figures 1-8 but section 125a is connected to section 127b by bolt 200 passing through oppositely threaded portions 201, 202 of sections 125a and 127b. Rotation of bolt 200 will raise or lower lever section 125a with respect to the remainder of the lever and thereby shift the position of tube 43 in accordance with the variation in the height of the protective dome or cone used. The adjustment, when made, may be retained by lock-nut 205.

After the cutting operation is performed, it may be necessary to scrape soil back to the row particularly where the blades may have dug into the row during the chopping operation. At the same time, it is necessary to protect the young plants from the soil which is scraped back.

Accordingly, the rearwardly extending bars 23, 24 carry transverse bars 220, 221 to which are secured the inverted trough or channel 231. The walls of channel 231 which extend longitudinally of the row are spaced just sufficiently far apart to pass on either side of the standing plants to protect them, thereby forming a protective moving tunnel for the plants. The walls of channel 231 carry, extending on either side, brackets 230 to which are secured scraping blades 232 adapted to scrape the soil back to the row and fill in the portions of the row previously chopped out. The channel walls, however, protect the young plants which remain standing from the soil which is thus scraped back.

Blades 232 on the first brackets 230 may be coarse. These are the only blades that are necessary. But finer blades 233 may be added on the second brackets 230 and smoothing blades or broom 234 may be added on the last brackets 232.

By my novel device, therefore, it becomes possible to chop and weed of the order of one acre per hour using a single machine for this purpose and a single operator who need not necessarily be skilled.

All operations of the chopper and weeder are driven by pulleys and belts from the main driving wheel or axle. The use of pulleys and belts for this purpose rather than chains and sprockets provides smooth operating members which will not collect and retain mud, soil and weeds.

The motion of the main wheel of the mechanism spins the chopping blades and also provides the drive for moving the blades down to cutting position and up again. The drive for this latter operation is such that the blades approach, cut and move away very rapidly thus minimizing the effect of the forward motion. Nevertheless, my novel mechanism contains means for moving the blades back with respect to the mechanism at a speed equal to the forward motion of the mechanism to hold the blades stationary with respect to the ground. Since the drive for this last operation is also taken from the main wheel, the speed of this relative rearward motion of the blades is directly related to the forward speed of the main wheel; the faster the entire mechanism moves forward, the faster is the relative rearward movement of the blades with respect to the mechanism during cutting. The blades thus remain stationary with respect to the ground during cutting irrespective of variations in the forward speed of the entire device during cutting.

For simplified operation, rearwardly extending guide and control handles connected to the main axle or forward of the main axle are provided; the handles extending to a point behind the scrapers and the protective inverted trough or channel and at a convenient height to be held by a man walking along the row.

The entire mechanism may be self-contained with a power plant mounted on a front platform; or the apparatus may be made as an attachment to be hitched to and trail behind a hand type tractor of well known type; or the apparatus may be arranged to be drawn by mechanical or other tractive means.

In operation, my novel device is drawn, not pushed, along the row by any of the means above pointed out, the blades spin at high speed while they move rapidly to approach the row and cut plants and weeds. The movement at the upper end of the stroke is correspondingly slowed down. The blades are automatically swung back to be stationary with respect to the ground during cutting and are swung forward again during the upper portion of the stroke.

While the stroke may be constant, the vertical position of the stroke may be adjusted when domes or cones of different heights are used. The adjustment may be made simply by rotating one bolt on the oscillating lever locking it in position by a lock nut. The domes and associated blades may readily be changed by removing a single nut which secures the dome in position, removing the dome, passing the opening in the new dome over the threaded extension of the shaft and replacing the nut.

Domes or cones are used rather than mere reentrant portions of the blades in order to provide a smooth interior housing wall which, if it rubs along a portion of the plant, will not tear or cut the plant which is supposed to be protected.

Thus the only adjustment necessary is that of changing the dome and blade assembly for plants at different stages of growth. Where the domes or cones vary in height, then the only other adjustment needed is the rotation of the bolt on the oscillating lever for adjusting the position of the stroke.

The scrapers are positioned to scrape at or just below the level of the tread of the main wheel to scrape soil back toward the row to restore soil which may have been chopped from the row. The trough is initially as tall as will be necessary to clear the tallest plants to be cut; the sides are spaced apart just enough to clear the plants. Where necessary, the spacing between sides may be made adjustable. Also the front edges of the side walls of the inverted trough or channel should flare outwardly so that any plant may enter therein without injury.

In the foregoing, I have described my invention only in connection with illustrative embodiments thereof. Since many variations and modifications of my invention will now be obvious to those skilled in the art, I prefer to be bound, not by the specific disclosures herein contained but only by the appended claims.

I claim:

1. A chopper and weeder for plant rows comprising a substantially vertical shaft, a plurality of substantially horizontal blades connected to the lower end of the shaft; a plant protector connected to the lower end of the shaft; said plant protector comprising at least a portion of the connection of the blades to the shaft; a source of power, a connection from said source of power to said shaft for rotating said shaft and blades, said shaft being vertically slidable while rotating, and a second connection from said source of power to said shaft for alternately lowering and raising said shaft and blades while said shaft and blades rotate.

2. A chopper and weeder for plant rows comprising a substantially vertical shaft, a plurality of substantially horizontal blades connected to the lower end of the shaft; a plant protector connected to the lower end of the shaft; said plant protector comprising at least a portion of the connection of the blades to the shaft; a source of power, a connection from said source of power to said shaft for rotating said shaft and blades, said shaft being vertically slidable while rotating, and a second connection from said source of power to said shaft for alternately lowering and raising said shaft and blades while said shaft and blades rotate, said blades and plant protector being removable and replaceable at the end of the shaft.

3. An automatic mechanical chopper and weeder for plant rows comprising a support movable along a plant row; a substantially vertical shaft, said shaft being rotatable on its axis and slidably mounted vertically with respect to said support; said support being pivotally mounted for limited rotation in a vertical plane; a plurality of radiating blades at the lower end of said shaft; a source of power, a connection from said source of power to said shaft for rotating said shaft to spin said blades; an oscillating lever connected to said source of power; a connection between one end of said lever and said shaft for moving said shaft vertically in its support while it is rotated; the connection between said lever and the source of power comprising a crankshaft, a connection between the opposite end of said lever and said crankshaft; and a cyclically speed changing drive for said crankshaft for increasing the speed of said crankshaft while the blade carrying shaft is lowered and correspondingly decreasing the speed of the crankshaft while the blade carrying shaft is raised.

4. An automatic mechanical chopper and weeder for plant rows comprising a support movable along a plant row; a substantially vertical shaft, said shaft being rotatable on its axis and slidably mounted vertically with respect to said support; said support being pivotally mounted for limited rotation in a vertical plane; a plurality of radiating blades at the lower end of said shaft; a source of power, a connection from said source of power to said shaft for rotating said shaft to spin said blades; said shaft being vertically slidable while rotating, and a second connection from said source of power to said shaft for moving said shaft vertically in its support while it is rotated, and means for swinging the lower end of said support in a vertical plane in a direction opposite to that in which the support as a whole moves while said shaft is lowered; a common crankshaft for operating said main shaft for vertical and swinging movement in synchronism with each other.

5. An automatic mechanical chopper and weeder for plant rows comprising a support movable along a plant row; a substantially vertical shaft, said shaft being rotatable on its axis and slidably mounted vertically with respect to said support; said support being pivotally mounted for limited rotation in a vertical plane; a plurality of radiating blades at the lower end of said shaft; a source of power, a connection from said source of power to said shaft for rotating said shaft to spin said blades; said shaft being vertically slidable while rotating, and a second connection from said source of power to said shaft for moving said shaft vertically in its support while it is rotated; means for swinging the lower end of said support in a vertical plane in a direction opposite to that in which the support as a whole moves while said shaft is lowered; and a common crankshaft for operating said main shaft for vertical and swinging movement in synchronism with each other, the apparatus for vertically moving said blade-shaft comprising an oscillating lever connected at one end to said blade-shaft and at the other end to said crankshaft.

6. An automatic mechanical chopper and weeder for plant rows comprising a support movable along a plant row; a substantially vertical shaft, said shaft being rotatable on its axis and slidably mounted vertically with respect to said support; said support being pivotally mounted for limited rotation in a vertical plane; a plurality of radiating blades at the lower end of said shaft; a source of power, a connection from said source of power to said shaft for rotating said shaft to spin said blades; said shaft being vertically slidable while rotating, and a second connection from said source of power to said shaft for moving said shaft vertically in its support while it is rotated; means for swinging the lower end of said support in a vertical plane in a direction opposite to that in which the support as a whole moves while said shaft is lowered; a common crankshaft for operating said main shaft for vertical and swinging movement in synchronism with each other, the apparatus for vertically moving said blade-shaft comprising an oscillating lever connected at one end to said blade-shaft and at the other end to said crankshaft, and the apparatus for swinging said support comprising a link connected between said crankshaft and the lower end of said support.

7. An automatic mechanical chopper and weeder for plant rows comprising a support movable along a plant row; a substantially vertical shaft, said shaft being rotatable on its axis and slidably mounted vertically with respect to said support; said support being pivotally mounted for limited rotation in a vertical plane; a plurality of radiating blades at the lower end of said shaft; a source of power, a connection from said source of power to said shaft for rotating said shaft to spin said blades; an oscillating lever; a connection between one end of said lever and said shaft for moving said shaft vertically in its support while it is rotated; and apparatus for varying the initial vertical position of said shaft in said support for varying the position of the vertical stroke thereof; said last mentioned apparatus comprising a vertically adjustable element on the oscillating lever; said vertically adjustable element including the connection between said oscillating lever and said shaft.

8. An automatic mechanical chopper and weeder for plant rows comprising a support movable along a plant row; a substantially vertical shaft, said shaft being rotatable on its axis and slidably mounted vertically with respect to said support; said support being pivotally mounted for limited rotation in a vertical plane; a plurality of radiating blades at the lower end of said shaft; a source of power, a connection from said source of power to said shaft for rotating said shaft to spin said blades; said shaft being vertically slidable while rotating, and a second connection from said source of power to said shaft for moving said shaft vertically in its support while it is rotated; said apparatus moving said shaft vertically relatively rapidly at the bottom end of its stroke and correspondingly slowly at the top end of its stroke; all of said elements being supported on a frame carried by at least a pair of wheels movable along the ground; and a belt and pulley driving connection between at least one of said wheels and the crankshaft, at least one of said pulleys being eccentric.

9. An automatic mechanical chopper and weeder for plant rows comprising a support movable along a plant row; a substantially vertical shaft, said shaft being rotatable on its axis and slidably mounted vertically with respect to said support; said support being pivotally mounted for limited rotation in a vertical plane; a plurality of radiating blades at the lower end of said shaft; a source of power, a connection from said source of power to said shaft for rotating said shaft to spin said blades; said shaft being vertically slidable while rotating, and a second connection from said source of power to said shaft for moving said shaft vertically in its support while it is rotated; said apparatus moving said shaft vertically relatively rapidly at the bottom end of its stroke and correspondingly slowly at the top end of its stroke; all of said elements being supported on a frame carried by at least a pair of wheels movable along the ground; a belt and pulley driving connection between at least one of said wheels and the crankshaft, and a belt and pulley driving connection between at least one of said wheels and said blade shaft.

FREDERICK W. PEEL.

REFERENCES CITED

The following references are of record in the file of this patent:

UNITED STATES PATENTS

| Number | Name | Date |
| --- | --- | --- |
| 1,701,893 | Newsom | Feb. 12, 1929 |
| 1,936,135 | Lierman et al. | Nov. 21, 1933 |
| 2,250,081 | Piper | July 22, 1941 |
| 2,332,262 | Rowe | Oct. 19, 1943 |

FOREIGN PATENTS

| Number | Country | Date |
| --- | --- | --- |
| 8,949 | Great Britain | Jan. 25, 1906 |